US007151796B2

(12) United States Patent
Allpress et al.

(10) Patent No.: US 7,151,796 B2
(45) Date of Patent: Dec. 19, 2006

(54) HIGH PERFORMANCE EQUALIZER WITH ENHANCED DFE HAVING REDUCED COMPLEXITY

(75) Inventors: Steve A. Allpress, Hoboken, NJ (US); Quinn Li, Madison, NJ (US)

(73) Assignee: Broadcom Corporation, Irvine, CA (US)

( * ) Notice: Subject to any disclaimer, the term of this patent is extended or adjusted under 35 U.S.C. 154(b) by 770 days.

(21) Appl. No.: 09/946,648

(22) Filed: Sep. 4, 2001

(65) Prior Publication Data

US 2002/0131490 A1 Sep. 19, 2002

Related U.S. Application Data

(60) Provisional application No. 60/279,907, filed on Mar. 29, 2001, provisional application No. 60/265,740, filed on Feb. 1, 2001, provisional application No. 60/265,736, filed on Feb. 1, 2001.

(51) Int. Cl.
*G06F 17/10* (2006.01)
*H03H 7/30* (2006.01)

(52) U.S. Cl. ............... 375/229; 375/233; 375/232; 708/300; 708/304; 708/322; 708/323

(58) Field of Classification Search ............... 375/233, 375/348, 229, 234, 341, 232, 230, 285, 346, 375/350; 348/617; 714/769; 708/323, 300, 708/301, 322, 304; 370/252; 455/296, 307, 455/67.1, 67.3; 381/103
See application file for complete search history.

(56) References Cited

U.S. PATENT DOCUMENTS 5,513,215 A * 4/1996 Marchetto et al. .......... 375/233
5,930,296 A * 7/1999 Kot .............................. 375/233
6,185,716 B1 * 2/2001 Riggle ......................... 714/769
6,535,554 B1 * 3/2003 Webster et al. ............. 375/233
6,625,236 B1 * 9/2003 Dent et al. .................. 375/341
6,734,920 B1 * 5/2004 Ghosh et al. ................ 348/614
6,754,294 B1 * 6/2004 Adireddy et al. ........... 375/348
6,898,239 B1 * 5/2005 Singvall ...................... 375/233

OTHER PUBLICATIONS

Sirikiat Ariyavisitakul, "A Decision Feedback Equalizer with Time-Reversal Structure", Apr. 1992, IEEE Journal on Selected Areas in Communcations, vol. 10, No. 3.*

* cited by examiner

*Primary Examiner*—Kevin Kim
*Assistant Examiner*—Linda Wong
(74) *Attorney, Agent, or Firm*—McAndrews, Held & Malloy, Ltd.

(57) ABSTRACT

An apparatus and method for implementing an equalizer which (1) combines the benefits of a decision feedback equalizer (DFE) with a maximum-a-posterori (MAP) equalizer (or a maximum likelihood sequence estimator, MLSE) (2) performs equalization in a time-forward or time-reversed manner based on the channel being minimum-phase or maximum-phase to provide an equalization device with significantly lower complexity than a full-state MAP device, but which still provides improved performance over a conventional DFE. The equalizer architecture includes two DFE-like structures, followed by a MAP equalizer. The first DFE forms tentative symbol decisions. The second DFE is used thereafter to truncate the channel response to a desired memory of $L_1$ symbols, which is less than the total delay spread of L symbols of the channel. The MAP equalizer operates over a channel with memory of $L_1$ symbols (where $L_1 <= L$), and therefore the overall complexity of the equalizer is significantly reduced.

3 Claims, 14 Drawing Sheets

HIGH PERFORMANCE EQUALIZER WITH ENHANCED DFE HAVING REDUCED COMPLEXITY

RELATED APPLICATIONS

This application claims priority of the following—U.S. Provisional patent application having Ser. No. 60/265,740, entitled "A Decision Feedback Equalizer for Minimum and Maximum Channels," filed Feb. 1, 2001; U.S. Provisional patent application having Ser. No. 60/265,736, entitled "Method For Channel Equalization For TDMA Cellular Communication Systems," filed Feb. 1, 2001; and U.S. Provisional patent application having Ser. No. 60/279,907, entitled "A Novel Approach to the Equalization of EDGE Signals," filed Mar. 29, 2001; all of which are hereby incorporated by reference in their entirety.

The application is also related to the following—U.S. patent application having Ser. No. 09/941,027, entitled "Decision Feedback Equalizer for Minimum and Maximum Phase Channels," filed Aug. 27, 2001; U.S. patent application having Ser. No. 09/941,300, entitled "High Performance Equalizer Having Reduced Complexity," filed Aug. 27, 2001; all of which are hereby incorporated by reference in their entirety.

FIELD OF THE INVENTION

The present invention provides an improved method and apparatus for channel equalization in communication systems wherein (1) the advantages of a decision feedback equalizer (DFE) are combined with those of a non-linear equalizer, including a maximum-a-posteriori (MAP) or maximum-likelihood sequence estimator (MLSE) equalizer, and (2) the equalization is performed in a time-forward or a time-reversed depending on the type of channel response.

BACKGROUND OF THE INVENTION

This invention addresses the receiver design for digital communication systems employing high-order modulation schemes and/or those operating in highly temporally dispersive channels. As an example, this invention has been applied to the Enhanced Data for Global Evolution (EDGE) standard ("Digital Cellular Communication System (Phase 2+) (GSM 05.01–GSM 05.05 version 8.4.0 Release 1999)"). The EDGE standard is built on the existing Global System for Mobile Communication (GSM) standard, using the same time-division multiple access (TDMA) frame structure. EDGE uses 8-PSK (Phase-shift keying) modulation, which is a high-order modulation that provides for high-data-rate services. In 8-PSK modulation, three information bits are conveyed per symbol by modulating the carrier by one of eight possible phases.

A wireless channel is often temporally dispersive. In other words, after a signal is transmitted, a system will receive multiple copies of that signal with different channel gains at various points in time. This time dispersion in the channel causes inter-symbol interference (ISI) which degrades the performance of the system. FIG. 1A shows a prior art example of a multipath channel profile where the channel is characterized as being minimum-phase. The main signal cursor 102 is followed in time by post-cursors 104, 106, 108, and 110, each having progressively lesser energy than the main cursor. FIG. 1B shows a multipath channel profile characterized as being maximum-phase, where the main signal cursor 120 being followed by post-cursor energy rays 122, 124, 126, and 128, which are greater in energy than the main signal 120.

To combat the effects of ISI at the receiver, many different types of equalization techniques can be used. One popular equalization technique uses a Decision Feedback Equalizer (DFE). The DFE cancels the extraneous multipath components to eliminate the deleterious effects of ISI. A DFE is relatively simple to implement and performs well under certain known circumstances. The performance of the DFE depends heavily on the characteristics of the channel. A DFE typically performs well over a minimum-phase channel, where the channel response has little energy in its pre-cursors, and its post-cursor energy decays with time. A DFE typically consists of a feed-forward filter (FFF) and a feedback filter (FBF). The FFF is used to help transform the channel into such a minimum-phase channel.

Certain advantages of a DFE include good performance with relatively low complexity. Certain disadvantages include, but are not limited to: (1) Error propagation—i.e., once an error is made, that error is fed back and propagated into future symbol decisions. (2) Sub-optimum performance—i.e., instead of capturing multipath energy in the channel, the DFE instead cancels out this energy. (3) Hard decision output—i.e., a DFE makes a decision on the transmitted symbol without providing any information associated with the reliability of that decision.

Other more complex equalization techniques utilize the multipath energy from the received signal, rather than trying to cancel the energy. Such non-linear equalizers include, but are not limited to, MLSE (Maximum Likelihood Sequence Estimation) and MAP (Maximum-A-Posterori) Estimation. These equalization techniques make a determination as to the most likely transmitted symbols, based upon all of the available information to the receiver. The MLSE is the optimum sequence estimator over a finite channel response. The complexity of the MLSE equalizer grows exponentially with the channel response duration, and the equalizer produces hard symbol decisions. The MAP equalizer operates in a similar fashion to the MLSE equalizer but provides soft symbol decisions. The primary disadvantage of the MAP equalizer is complexity. Hence, while these example equalizers are better at handling problematic signals, their implementations can prove to be very complex and expensive for systems using high-order modulation, such as the EDGE system. See G. David Forney. Jr., "Maximum-Likelihood Sequence Estimation of Digital Sequences in the Presence of Intersymbol Interference," *IEEE Trans. Inform. Theory*, vol. 18, pp. 363–377, May 1972; J. G. Proakis, "Digital Communications," ($3^{rd}$ edition) New York; McGraw-Hill, 1995. The contents of both the foregoing references are incorporated herein by reference.

The complexity of the MLSE and MAP equalizers, implemented using the known Viterbi algorithm (or the like), is exponentially proportional to the memory of the channel. In particular, the number of states required in the MLSE or MAP equalizer is given by $M^L$, where M is the size of the symbol alphabet and L is the memory of the channel in symbols. Moreover, the use of 8PSK modulation in the EDGE system makes the complexity of the MLSE and MAP equalizers very large for channels with moderate delay spreads. Note that different channel models exist for different types of terrain and are used to quantify receiver sensitivity in the GSM standard. For example, the Hilly Terrain (HT) channel model has a profile that spans more than five symbols and would therefore require an MLSE or MAP equalizer with 32,768 states to achieve acceptable performance.

Techniques to reduce the number of states of the MLSE have been proposed. See, e.g., Alexandra Duel-Hallen and Chris Heegard, "Delayed decision-feedback sequence estimation," IEEE Transactions on Communications, vol. 37, no. 5, p. 428–436, May 1989; M. Vedat Eyboglu and Shahid U. Qureshi, "Reduced-state sequence estimation with set partitioning and decision feedback," IEEE Transactions on Communications, vol. 36, no. 1, pp. 13–20, January 1988. Under these techniques, a subset of the full state space is chosen as the state space, and a DFE is implemented on every state of the trellis (i.e., as shown in a state space diagram). However, the complexity of computing the path metric values in these algorithms is still very large for channels with a large delay spread.

Accordingly, what is needed in the field of the art is an equalizer device that provides for a simpler implementation, such as a DFE, but which provides the improved performance characteristics of a more complex equalizer, such as an MLSE or MAP. The DFE should also be able to perform well over both minimum and maximum phase channels. The equalizer should be generally applicable to all digital communication systems but provide particular advantage to coded systems using higher-order modulation schemes.

SUMMARY OF THE INVENTION

The present invention describes an equalizer which combines the benefits of the aforementioned decision feedback equalizer (DFE) with a maximum-a-posterori (MAP) equalizer (or a maximum likelihood sequence estimator, MLSE) to provide an equalization device with lower complexity than a full-state MAP or MLSE device, but which still provides improved performance over a pure DFE solution. Since the performance of the DFE portion of the combined equalizer depends on the characteristics of the channel, the present invention also describes an apparatus and method to improve the performance of the combined DFE-MAP equalizer for channels with maximum-phase characteristics. For minimum-phase channels, the equalization can be performed in a conventional, time-forward manner. For maximum-phase channels, the equalization can be performed in a time-reversed manner. More specifically, the FFF and the FBF coefficients can be computed based on the channel estimates reversed in time. Additionally, the FFF and the FBF operations can be performed with the received block of symbols in a time-reversed order, i.e., the most recently received symbol is processed first. By processing in this manner, the channel seen by the DFE will have a minimum phase, since its time-reversed channel response has maximum phase.

In the present invention, the equalizer architecture includes two DFE-like structures, followed by a MAP equalizer. The channel response is estimated and used to derive the coefficients of the feed-forward and feedback filters. The coefficients of the feedback filter of the second DFE are a subset of the coefficients of the first feedback filter.

The first DFE acts like a conventional DFE and forms tentative symbol decisions. The second DFE is used thereafter to eliminate, or subtract, the impact of certain postcursors that exist past a certain memory, $L_1$, (where $L_1 <= L$) of the channel, by using the tentative decisions formed by the first DFE. The effective channel response seen by the MAP equalizer is therefore constrained to a memory $L_1$, and therefore the overall complexity of the equalizer is significantly reduced. When the value of $L_1$ is zero, the proposed equalizer degenerates to a conventional DFE. When the value of $L_1=L$, the proposed equalizer is a full state MAP equalizer. Therefore performance versus complexity trade-offs between a simple DFE and a full-state MAP equalizer can be made.

An MLSE equalizer might also be used in place of the MAP equalizer in the described configuration, if further complexity reduction is desired. However, usage of the MLSE will come at the expense of receiver sensitivity.

Accordingly, one aspect of the present invention provides for a reduced-complexity equalizer apparatus for use with communication systems requiring equalization of a received signal subject to intersymbol interference (ISI), the apparatus comprising: a channel estimator for providing an estimated channel response from received signal data; a device for determining if the channel is minimum phase or maximum phase; a first decision feedback equalizer device which utilizes coefficients derived from the estimated channel response, based upon whether the channel is minimum phase or maximum phase and forms tentative symbol decisions; at least a second decision feedback equalizer device which utilizes coefficients derived from the estimated channel response, based upon whether the channel is minimum phase or maximum phase, and the tentative symbol decisions from the first decision feedback equalizer, to truncate the channel response to a desired channel memory; and at least one non-linear equalizer device for providing equalization of the truncated channel response over the desired memory; and whereby the overall complexity of the entire equalizer structure is reduced by reducing the effective delay spread of the channel.

Still another aspect of the present invention provides for a method for reducing the complexity of an equalizer for use with a communication system requiring equalization of a received signal subject to intersymbol interference (ISI), the method comprising the steps of: estimating a channel response from received signal data; determining the phase characteristic of the channel response; deriving feedback and feed-forward coefficients for the associated feedback and feed-forward filters of a first and at least one subsequent decision feedback equalizer from the estimated channel response, based upon whether the channel response is minimum phase or maximum phase; utilizing the first decision feedback equalizer to form tentative decisions regarding certain symbols, based upon whether the channel response is minimum phase or maximum phase; utilizing at least one subsequent decision feedback equalizer to truncate the channel response to a desired memory, based upon whether the channel response is minimum phase or maximum phase, and; utilizing at least one non-linear equalizer for providing equalization of the truncated channel response over the desired memory, whereby the overall complexity of the equalizer is reduced by reducing the effective delay spread of the channel.

BRIEF DESCRIPTION OF THE DRAWINGS

Certain aspects and advantages of the present invention will be apparent upon reference to the accompanying description when taken in conjunction with the following drawings, which are exemplary, wherein.

DESCRIPTION OF THE PREFERRED EMBODIMENTS

The present invention is described below in terms of certain preferred embodiments, and representative applications. The apparatus and processing methods are applicable to any wireless or wireline communication system where an equalizer is used to eliminate the ISI effects of the channel.

A representative application of the invention is the EDGE system, and a preferred embodiment is described below. Since radio spectrum is a limited resource, shared by all users, a method must be devised to divide up the bandwidth among as many users as possible. The GSM/EDGE system uses a combination of Time- and Frequency-Division Multiple Access (TDMA/FDMA). The FDMA part involves the division by the frequency of the (maximum) 25 MHz bandwidth into 124 carrier frequencies spaced 200 kHz apart. One or more carrier frequencies is assigned to each base station. Each of these carrier frequencies is then divided in time, using a TDMA scheme. The fundamental unit of time in this TDMA scheme is called a burst period, and it lasts for $15/26$ ms (or approximately 0.577 ms). Eight burst periods are grouped into a TDMA frame ($120/26$ ms, or approximately 4.615 ms) which forms the basic unit for the definition of logical channels. One physical channel is one burst period per TDMA frame.

Figure 1A:
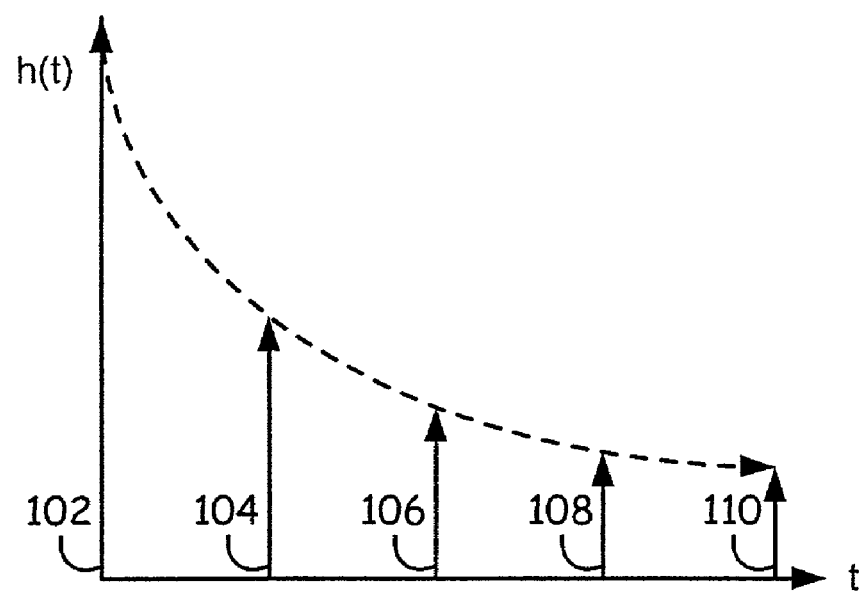
FIG. 1A is a prior art representation of typical multipath channel with a time-decaying channel response.
Figure 1B:
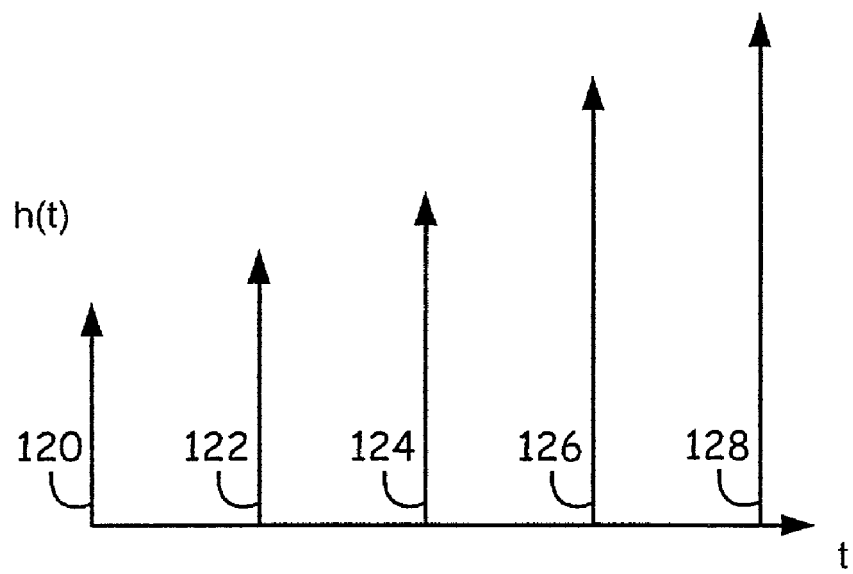
FIG. 1B is a prior art representation of typical maximum-phase channel profile.
Figure 2:
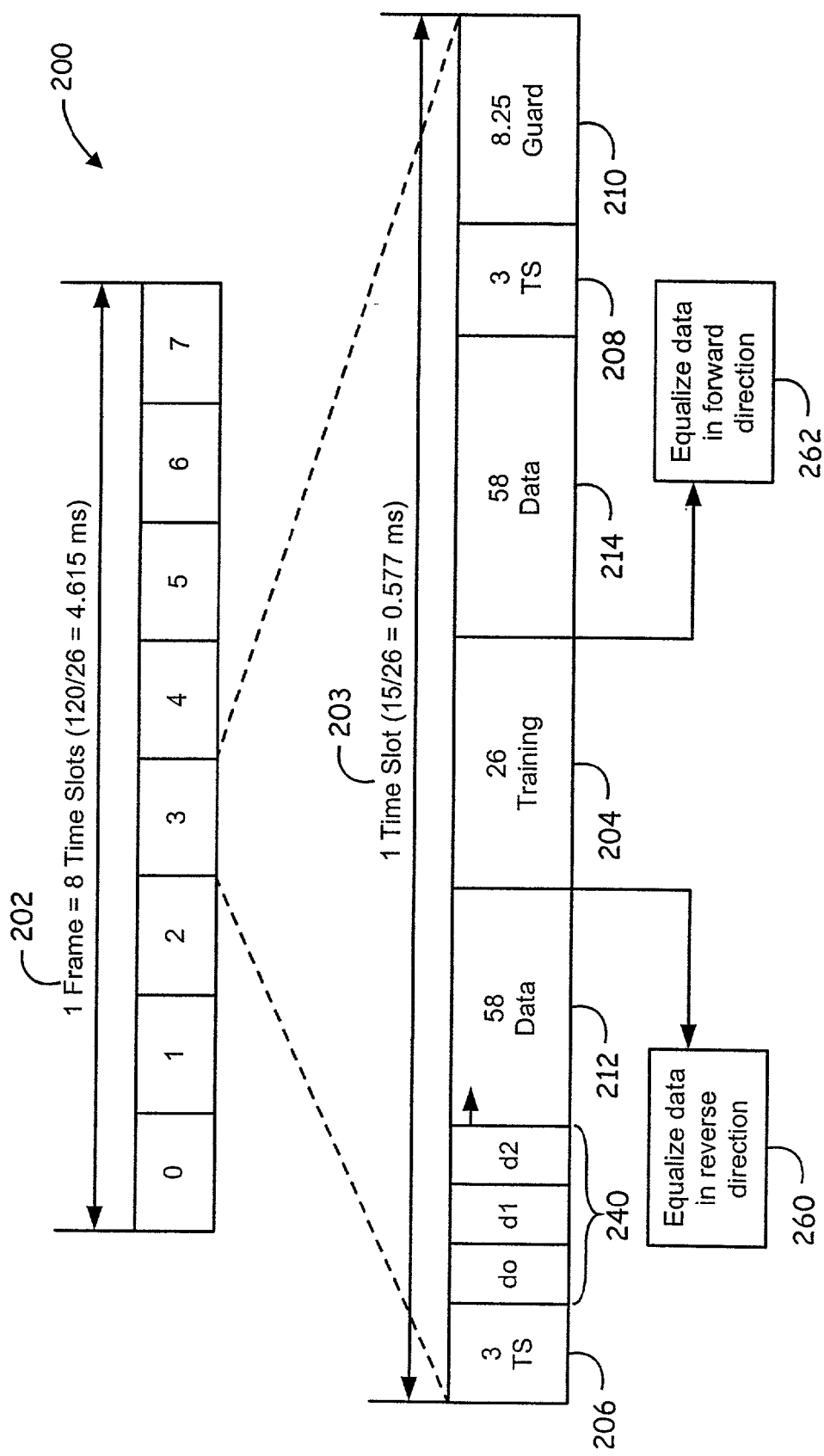
FIG. 2 is a prior art diagram of an EDGE burst structure.

Many EDGE physical layer parameters are identical (or similar) to those of GSM. The carrier spacing is 200 kHz, and GSM's TDMA frame structure is unchanged. FIG. 2 shows a representative diagram 200 of an EDGE burst structure. One frame 202 is shown to include eight time slots. Each representative time slot 203 is shown to include a training sequence 204 of 26 symbols in the middle, three tail symbols 206, 208 at either end, and 8.25 guard symbols 210 at one end. Each burst carries two sequences of 58 data symbols. The data sequences 212 and 214 are shown on either side of the training sequence 204.

Figure 3:
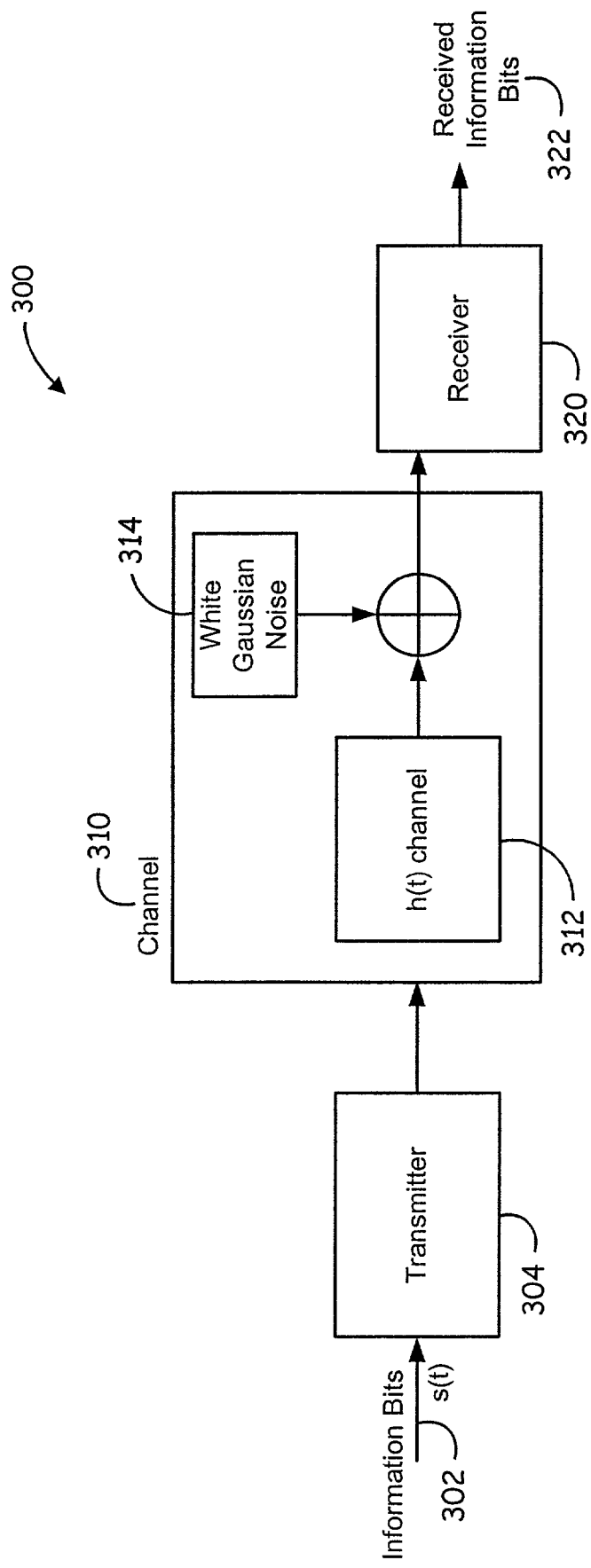
FIG. 3 is a prior art block diagram of representative transmitter, channel, and receiver.

FIG. 3 next shows a prior art block diagram 300 of a communication system that consists of a transmitter 304, a channel 310, and a receiver 320. The signal s(t) 302 represents a sequence of information that is going to be transmitted over a channel. The transmitted signal encounters a channel 310 (which includes multiplicative, dispersive component 312 and additive white Gaussian noise component 314). The receiver 320 attempts to recover the original signal s(t) as received information bits 322.

Figure 4:
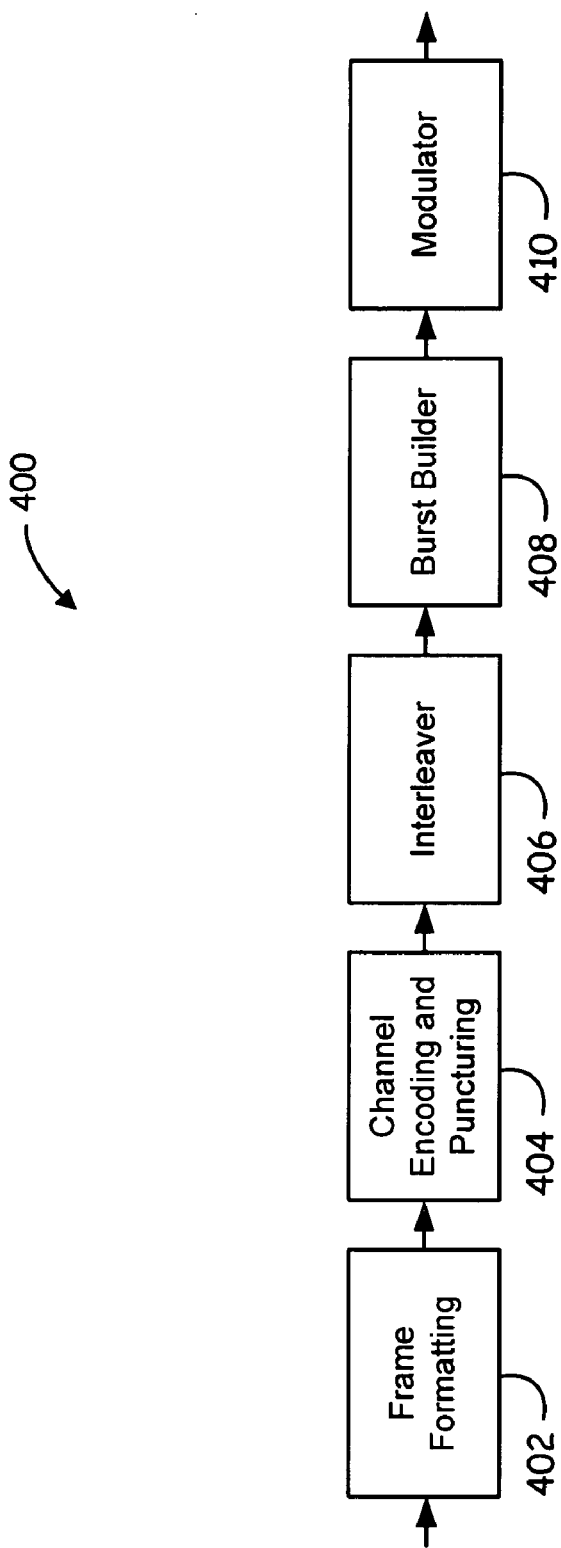
FIG. 4 is a prior art block diagram of representative transmitter elements.

A more specific block diagram of the transmitter portion 400 is shown in FIG. 4. In particular this diagram is described in terms of GSM and EDGE applications. The user data is first formatted into a frame via block 402. Thereafter the data is convolutionally encoded and punctured as shown in block 404. The signal is passed to an interleaver 406 that scrambles the coded bits and distributes them across four bursts, shown as the burst builder block 408. The GMSK or 8PSK modulator is shown receiving the subsequent signal in block 410.

The transmitted signal thereafter passes through a multi-path fading channel h(t) and is corrupted by additive white Gaussian Noise n(t). Assuming that the span of the overall channel response is finite, the discrete-time equivalent model of the received signal can be written as $$r_n = \sum_{k=0}^{L} d_{n-k} h_k + \eta_n, \qquad (1)$$

where L is the span of the composite channel response (consisting of the cascade pulse-shaping filter, propagation channel and the receiver front-end filter), dn is the nth transmitted data symbol, $\{h_0, h_1, \ldots, h_L\}$ are the complex coefficients of the channel response, and $\eta_n$ is the complex, zero-mean, white Gaussian random variable.

Figure 5:
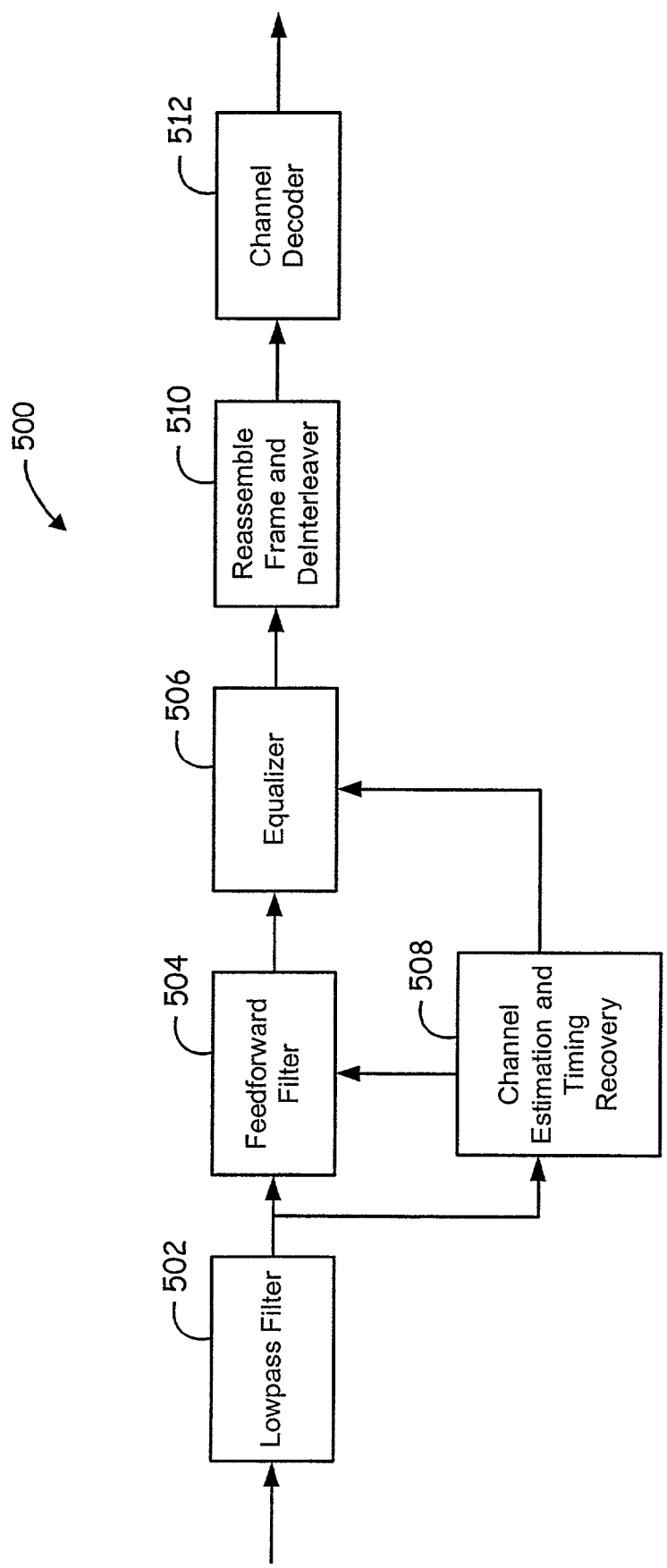
FIG. 5 is a block diagram of representative EDGE receiver elements, wherein the channel estimation might incorporate certain aspects of the present invention.

A block diagram of a typical EDGE receiver 500 is shown in FIG. 5. The received signal, after analog-to-digital conversion, is passed through a digital low-pass filter 502 (or matched filter) to enhance the signal-to-noise ratio within the signal bandwidth of interest. A feed-forward filter (FFF) 504 is used to try to convert the channel to a minimum-phase channel. The FFF coefficients are computed in block 508 based on the channel estimates, which along with the sample timing are derived from the correlation of the received signal with a known training sequence. The output from the FFF is passed to an equalizer 506, which attempts to eliminate the ISI having the composite response given by the transmitter pulse, the channel impulse response, and the receiver filter. The equalizer might be a DFE, MLSE, or MAP. In block 510, the output from the equalizer is then reassembled into a frame, and a deinterleaver is applied (if needed). This signal is then passed to the channel decoder 512, if channel coding was applied at the transmitter.

Figure 6:
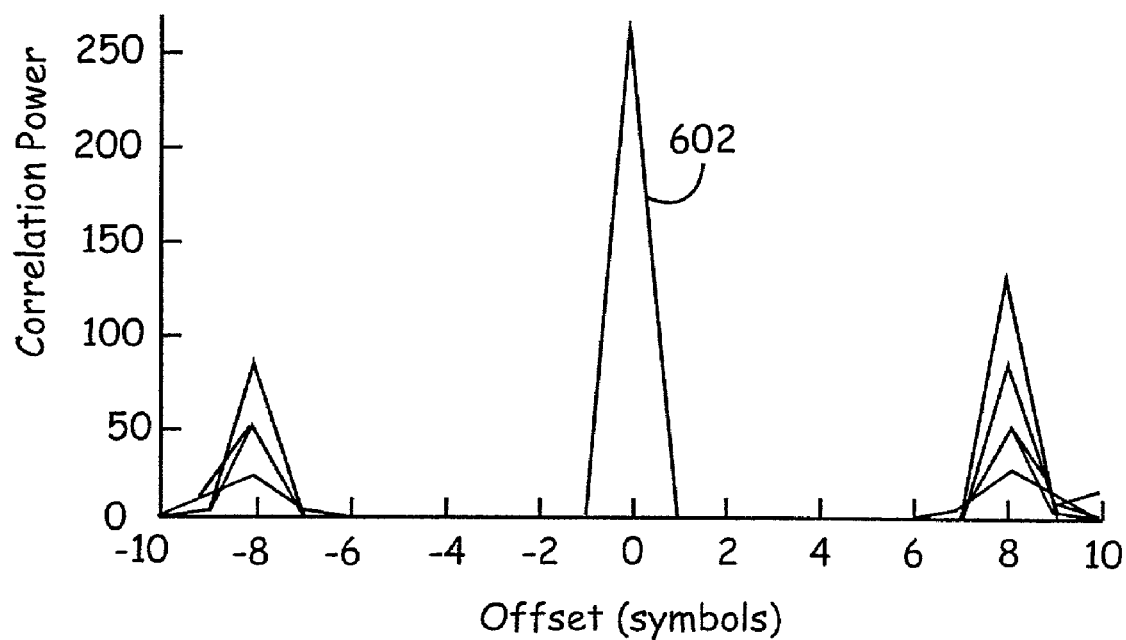
FIG. 6 is a prior art diagram of the auto-correlation of Training Sequences.

Timing recovery and channel estimation—the timing recovery and channel estimation are performed with the aid of the training sequence 204 (in FIG. 2). The training sequence has the property that the result of correlating the middle 16 symbols with the entire training sequence yields a correlation function with identically zero values for +/−5 symbols around the peak 602, as shown in FIG. 6.

For timing recovery, the oversampled received signal is correlated with the stored training sequence. The optimal symbol timing is given by the index of the subsample with the largest correlation value. Once the optimal symbol timing is determined, the estimates of the channel response, i.e., $\{h_0, h_1, \ldots, h_L\}$ are given by a window of $L+1$ symbol-spaced correlation values with the largest sum of energy. Since the auto-correlation values given by the training sequence are approximately zero for up to +/−7 symbols around the peak 602, the maximum window size L may be as large as 7. Since the duration of the burst is 0.577 ms, the channel can be assumed to be stationary during the burst for most vehicle speeds of practical interest.

Certain well-known equalization techniques are next discussed, including DFE and MLSE/MAP devices, followed by certain representative embodiments of the proposed new technique.

Figure 7:
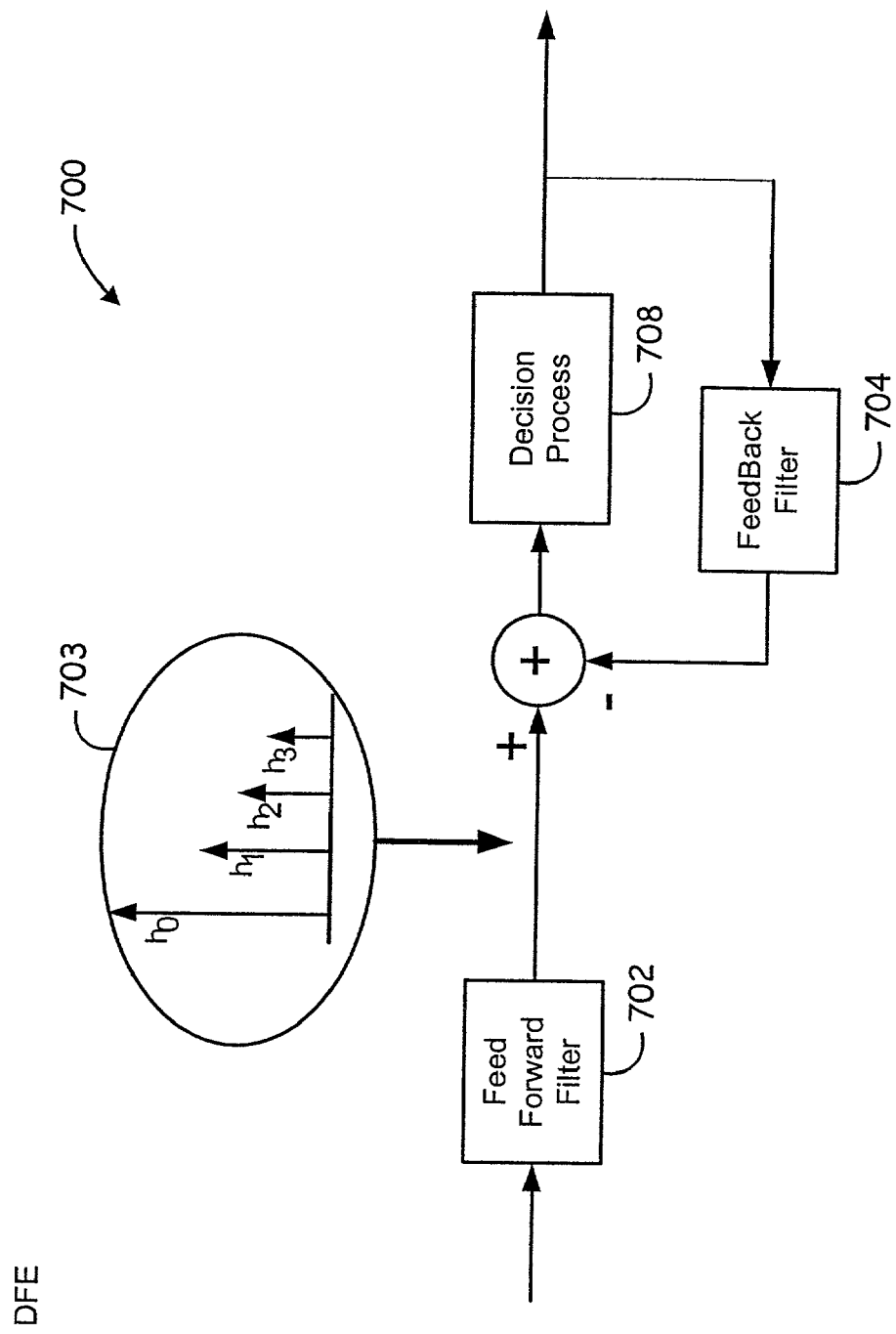
FIG. 7 is a prior art block diagram of representative DFE elements, with an associated channel response after the feed-forward filter.

Decision Feedback Equalizer—FIG. 7 shows a representative prior art block diagram 700 of a DFE device, which might be used as the equalizer device above. A standard DFE consists of two filters, a feed-forward filter (FFF) 702 and a feedback filter (FBF) 704. The FFF is generally designed to act as a whitened matched filter to the received incoming signal, thus maximizing the signal to noise ratio, while keeping the statistical properties of the noise Gaussian with zero mean. A representative signal (with interference) which might exist after the FFF is shown as 703, with signal rays $h_0$, $h_1$, $h_2$, and $h_3$. The FBF 704 is used to reconstruct post-cursor interference using decisions made on previously detected symbols. After filtering 704, the post-cursor interference is subtracted from the output of FFF 702, and a symbol decision 708 is made on this output.

Accordingly, the input to the decision device, in discrete form, is as follows:

$$z_n = \sum_{k=-N_f}^{0} f_k r_{n-k} - \sum_{k=1}^{N_b} \hat{d}_{n-k} b_k, \quad (2)$$

where $f_k$, $k=-N_f, \ldots, 0$ are the coefficients of the feed-forward filter, $b_k$, $k=1, \ldots, N_b$ are the coefficients of the feedback filter, and $\hat{d}_n$ denotes the decision made on the symbol $d_n$. The number of the feedback coefficients $N_b$ may be different from the memory of the overall channel response L. Hereafter, we will assume $N_b=L$. The coefficients of the FFF and the FBF for the DFE can be computed using a variety of computationally efficient methods. See, e.g., N. Al-Dhahir and J. M. Cioffi, "Fast Computation of Channel-Estimate Based Equalizers in Packet Data Transmission", IEEE Trans. Signal Processing, vol. 43, no. 11, pp. 2462–2473, Nov. 1995, the contents of which are incorporated herein by reference.

Soft-decision decoding might also be applied to the outputs of the DFE. As shown in FIG. 5, the symbol decisions from the equalizer are de-interleaved and passed to the channel decoder. Since soft-decision decoding improves the performance, the hard symbol decisions output from the DFE are weighted with the appropriate channel gain before they are passed to the decoder. Typically a hard-decision is made on the symbol $d_n$ which is then weighted by a soft-value $s_o$, as given by the following equation, to produce an appropriate weighting for soft-decision decoding.

$$s_o = \sum_{k=0}^{L} h_k h_k^* \quad (3)$$

Hence, the soft value is a function of the channel coefficients. Other examples include making the soft value proportional to the energy gain of the channel.

MLSE/MAP. An MLSE is the optimum equalizer in the presence of finite ISI and white Gaussian noise. The equalizer consists of a matched filter followed by a Viterbi algorithm. The complexity of the equalizer is determined by the number of states of the Viterbi algorithm, $M^L$, where M is the symbol alphabet size and L is the memory of the channel. For high order modulations, such as 8PSK and 16QAM, the complexity of the equalizer is very large, even for moderate values of L.

Similar to the MLSE, the MAP criterion may be applied, resulting in an equalizer that has the same order of the complexity as the MLSE, but is able to produce soft symbol outputs. The soft symbol values improve the performance of the subsequent channel decoder for a coded system.

For the MLSE or the MAP equalizer, the feed-forward filter can be implemented as a matched filter with coefficients $f_{-k}=h^*_K$, $K=0, \ldots, L$. Although the noise samples after the matched filter are non-white, the optimal path metric can be computed using the method described by Ungerboeck (see Gottfried Ungerboeck, "Adaptive maximum-likelihood receiver for carrier-modulated data-transmission system," IEEE Transactions on Communications, vol. COM-22, No. 5, pp. 624–636, May 1974). The path metric in the nth interval is given by:

$$\text{Re}\left[\alpha_n^*\left(y_n - \sum_{i=1}^{L} s_i \alpha_{n-i}\right)\right], \quad (4)$$

where $y_n$ is the output of the matched filter, $\alpha_n$ is the hypothetical input symbol and $\alpha_{n-i}$, $i=1, \ldots, L$ is given by the state of the trellis, and $s_i$ is given by the following convolution:

$$s_i = \sum_{k=0}^{L-i} h_k^* h_{k+i} \quad (5)$$

For the MLSE, the hard symbol decisions output from the equalizer are weighed according to Equation (3) prior to being passed to the channel decoder. The MLSE/MAP equalizers typically achieve better performance over a DFE. Nevertheless, they are significantly more complex to implement than the DFE for the same channel memory.

Figure 8:
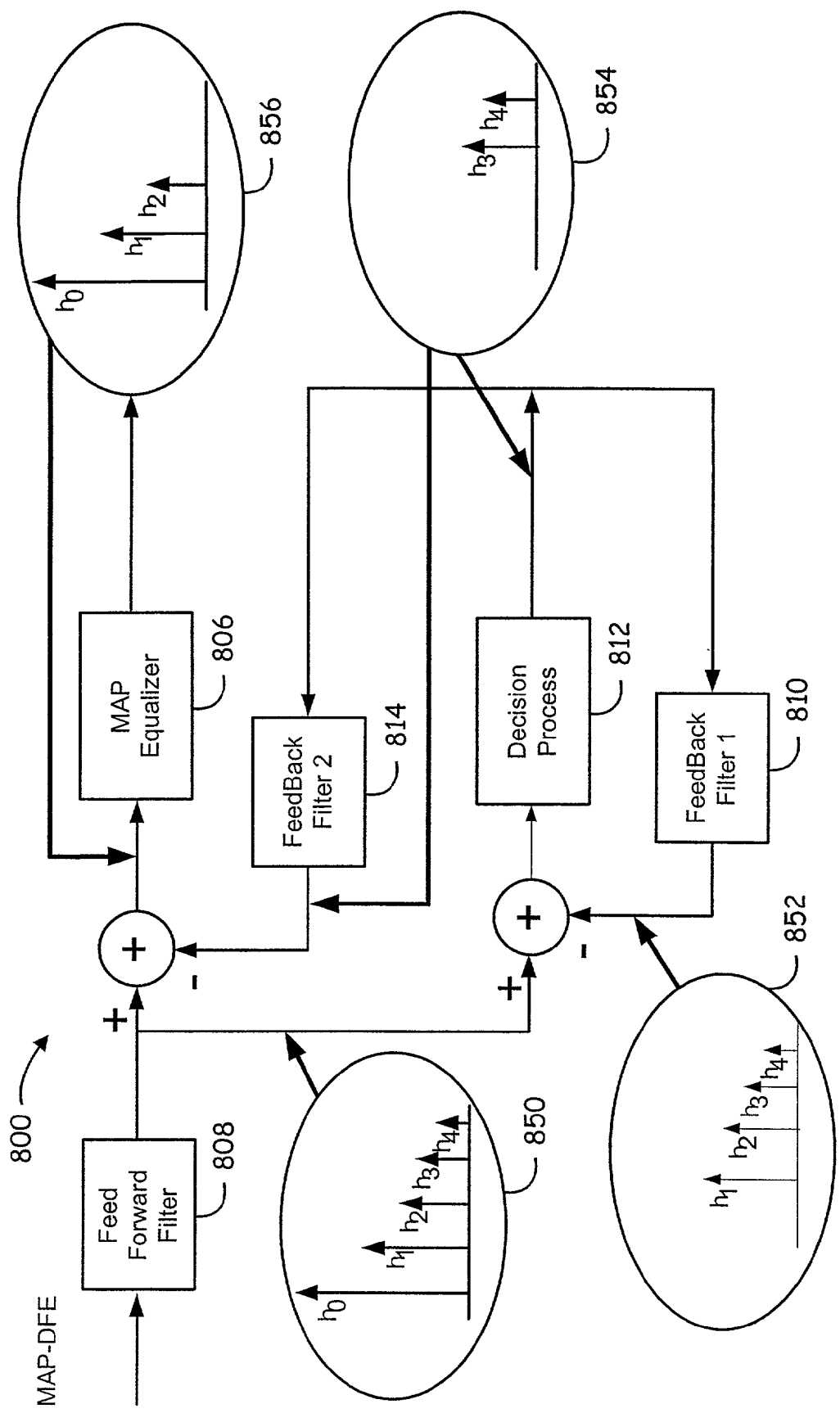
FIG. 8 is a block diagram, according to one aspect of the present invention, of certain representative elements of an equalizer which combines a DFE with a MAP equalizer.
Figure 9:
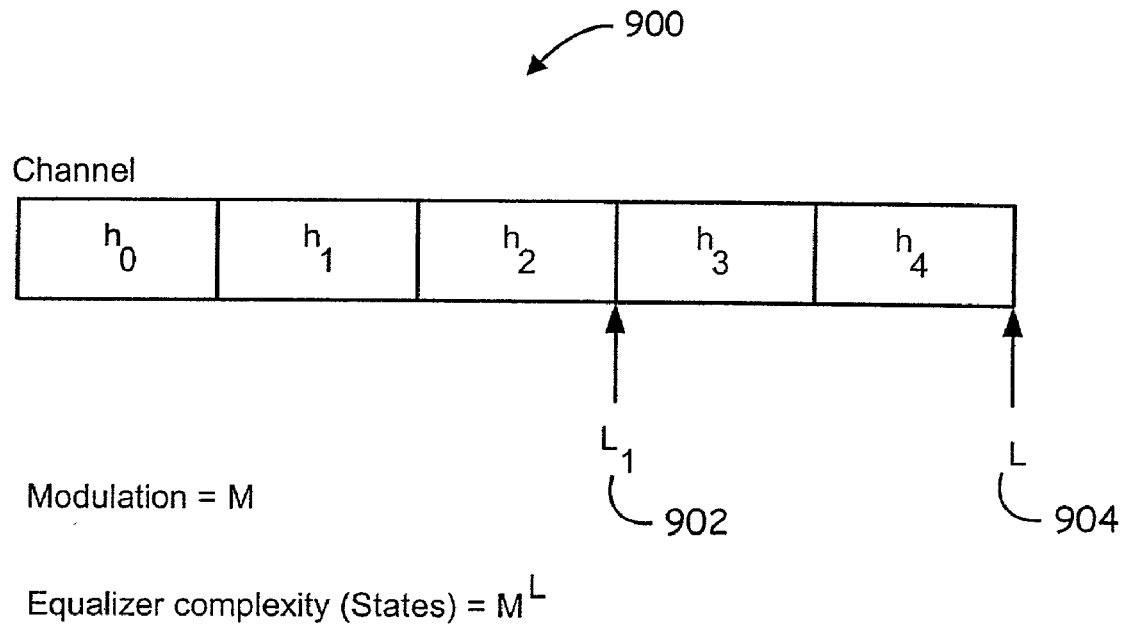
FIG. 9 is a block diagram, according to one aspect of the present invention, of a representative channel response showing the resulting elements of the truncated channel.

The proposed approach for equalizing 8PSK (or other such high-order) modulation signals consists of (1) a combination of a DFE with a MAP equalizer (DFE-MAP) and (2) to perform equalization of the received signal in a time-forward or time-reversed manner based on the type of the channel response. A block diagram of an embodiment of the present invention 800 is shown in FIG. 8. The equalizer architecture consists of two DFE-like structures 802 and 804, followed by a MAP equalizer 806. A feed-forward filter is shown as 808. The first DFE 802 acts like a conventional DFE and forms tentative symbol decisions. The coefficients of the feed-forward filter 808 and the first feedback filter 810 are derived from the channel estimates, as in the conventional DFE case. The coefficients of the second feedback filter 814 are a subset of the coefficients of the first feedback filter 810. The input to the decision process 812 is thus given by the prior Equation (2).

Accordingly, a sample channel response 850 is shown after the feed-forward filter 808, containing signal rays $h_0$ through $h_4$. The first DFE structure 802 serves to first provide feedback signals through the first feedback filter 810 as shown by the signal rays $h_1$ through $h_4$ in 852.

The purpose of the second feedback filter 814 is to eliminate the impact of post-cursors (e.g., $h_3$ and $h_4$, shown by 854) beyond $L_1$ symbols (e.g., set at $h_2$), and thereby truncating the channel response to a desired memory of $L_1$ symbols. The filter does this by canceling these post-cursors using the tentative decisions $\hat{d}_k$ formed by the first DFE.

This is achieved by breaking the received signal after the feed-forward filter 808 into two parts, as shown by Equation (6), and thereafter constraining the maximum number of states in the MAP equalizer to be $M^{L1}$ states out of a maximum possible of $M^L$ for the full state space.

$$\sum_{k=0}^{L_1} d_{n-k} b_k + \sum_{k=L_1+1}^{L} d_{n-k} b_k + \varphi_n \quad (6)$$

where $\phi$ is the noise sample at the symbol rate after passage through the whitened-matched filter.

A tentative estimate of the data sequence, $\{\hat{d}_n\}$ is produced by the first DFE structure 802 (using hard symbols decisions of the $z_n$ output of Equation (2)), and together with the feedback coefficients, $\{b_k\}$, is used to limit the duration of the intersymbol interference to $L_1$ symbols.

Thus the input to the MAP equalizer becomes:

$$\sum_{k=-N_f}^{0} f_k r_{n-k} - \sum_{k=L_1+1}^{L} \hat{d}_{n-k} b_k, \quad (7)$$

where $L_1 \leq L$. Since the MAP equalizer now operates only on $M^{L1}$ states, the overall complexity of the equalizer is significantly reduced.

For instance, with a channel memory of L=5, and a modulation order of 8 (as used by 8PSK), a conventional MAP equalizer would require $8^5$ states, or 32768 states. By using the present system, the effective channel memory seen by the MAP would be reduced to 3 (see signal 856) and the equalizer would only require $8^3$ states, or 512 states. With substantially fewer states, the proposed equalizer configuration would be much more manageable and less complex to implement.

Figure 11:
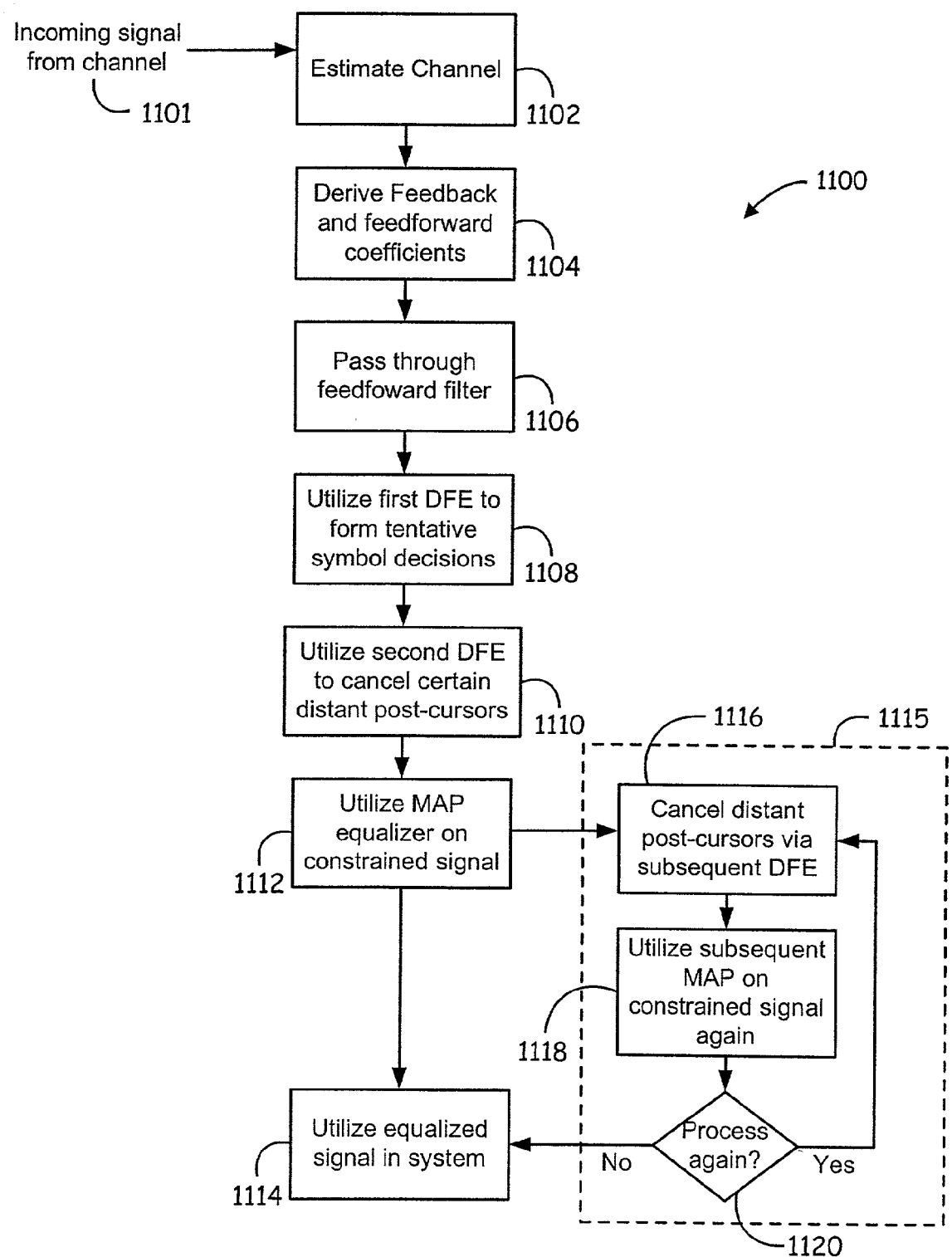
FIG. 11 is a flowchart, according to one aspect of the present invention, of certain representative steps that can be used to implement the present method of equalization.

FIG. 11 next shows a graphical representation 900 of this representative channel response having elements $h_0$ through $h_4$. When the value of $L_1$ (902) is zero, the proposed equalizer degenerates to a conventional DFE, and when the value of the $L_1$=L (904), the proposed equalizer is a full-state MAP equalizer. By choosing the appropriate value of $L_1$, certain performance and complexity trade-offs between a DFE and a full-state MAP equalizer can be made.

Figure 10:
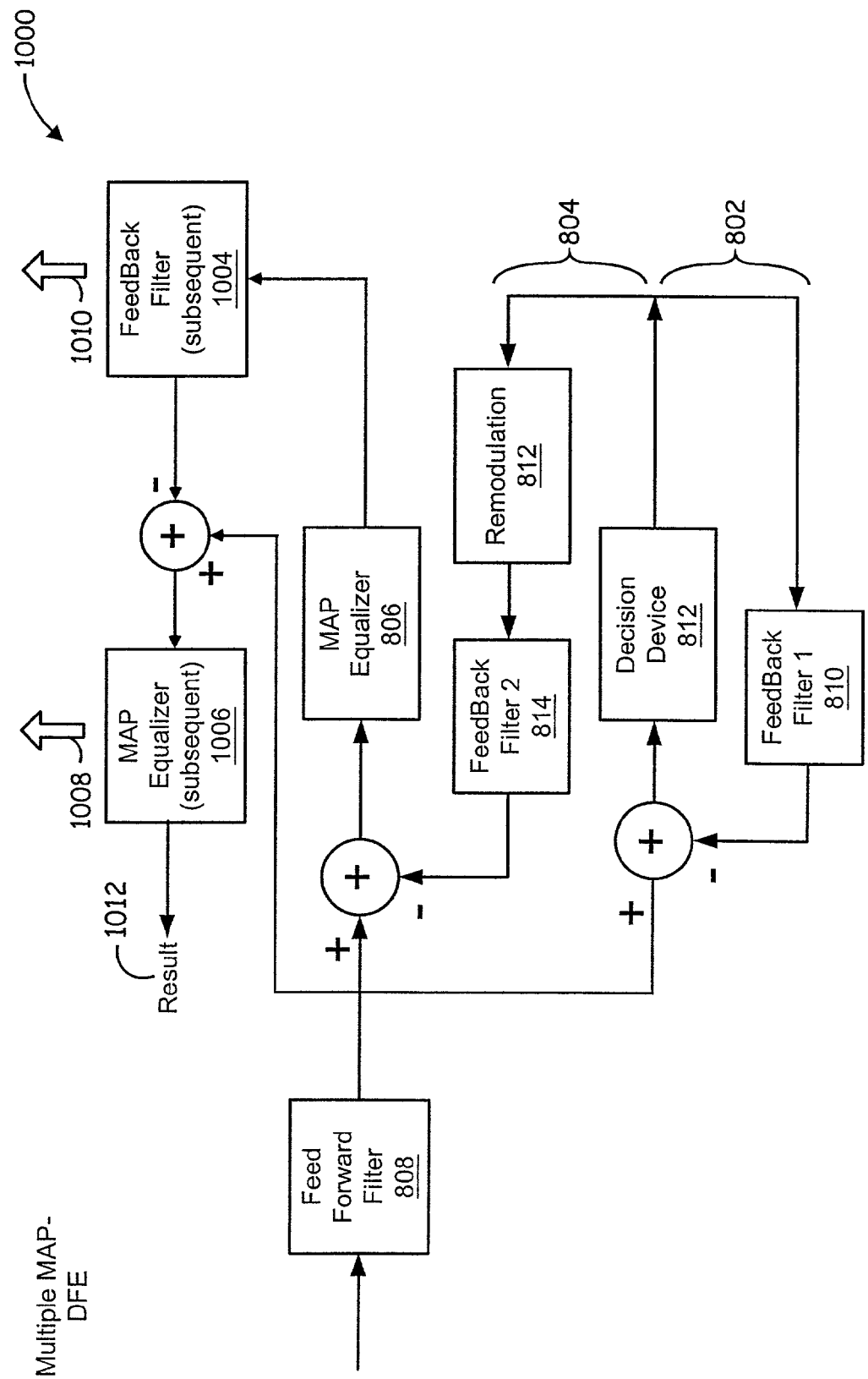
FIG. 10 is a block diagram, according to one aspect of the present invention, of certain representative elements of the present equalizer which combines a DFE with a MAP equalizer, and then also employs subsequent DFE/MAP equalizers, as needed.

While not expressly shown, it should also be noted that an MLSE equalizer can be used instead of the MAP equalizer in the present invention. The MLSE device will further reduce the complexity of the implementation but at the expense of receiver sensitivity. The present invention is not intended to be limited to the specific embodiments shown above. FIG. 10 shows a block diagram having substantially the same components (similarly numbered) as FIG. 8. After the MAP equalizer 806, however, a subsequent feedback filter 1004 is shown. The results of this subsequent feedback filter 1004 are then subtracted from the output of the feed-forward filter 808. This signal is then fed into a subsequent MAP equalizer (represented by continuation arrow 1008) to provide a result 1012 which provides even better performance characteristics. Note that the arrows 1008 and 1010 are meant to indicate that even more feedback filters and MAP equalizers might be added, if further processing is needed. The addition of such subsequent filters will increase the complexity of implementation, but (again) may provide for increased performance up to certain limits, wherein additional filters will not be worth their implementation cost.

FIG. 11 next shows a representative flowchart of certain steps 1100 that might be used to implement the present invention. In step 1102, an estimate is taken of the channel, which is shown receiving an incoming signal 1101, as per the general approaches described above. In step 1104, the feedback and feed-forward coefficients are derived for the associated filters of the DFEs, based upon the estimate of the channel response. In step 1106, the signal passes through a feed-forward filter whose coefficients have been determined above. In step 1108, a first DFE (including at least a feedback filter and decision process) is utilized to form tentative symbol decisions. Step 1110 shows the second DFE being used to cancel (or subtract) certain distant post-cursors. The number of post-cursors to be cancelled depends upon the memory of the channel response and the overall complexity desired (or a desired memory of the channel) in the final implementation. The cancellation of such post-cursors serves to truncate the memory of the channel, whereby the overall complexity of the equalizer is reduced by reducing the effective delay spread of the channel. Step 1112 next runs a MAP equalizer on this truncated channel. Thereafter the resulting signal might be utilized (1114) as an equalized signal in any system that might require such an equalized signal.

Certain optional steps for implementation are shown in block 1115. Step 1116 is shown canceling certain distant post-cursors (again, like 1110). This would be achieved by subsequent implementations of DFE components (i.e., feedback filters in association with feed-forward filters, and linear equalizers) as implied by arrows 1008 and 1010 in FIG. 10. Block 1118 next shows the step of utilizing a subsequent MAP equalizer on the constrained signal. Decision block 1120 inquires whether further processing is needed (or desired). If yes, then steps 1116 and 1118 can be repeated as many times as might be needed with subsequent equalizer implementations (again referring to elements 1008, 1010 in FIG. 10). If no further processing is needed, then the flow proceeds to step 1114 where the resulting equalized signal is utilized.

While one aspect of the present invention deals with a combined DFE and MAP equalizer, the other aspect deals with enhancing the performance of the equalizer based on the characteristics of the channel. Based on the channel estimates given from the channel estimator block 508 in FIG. 5, a determination of whether or not the channel has a maximum-phase response is made. In the context of this invention, the term "minimum-phase channel" implies that the energy of the leading part of the channel profile is greater than the energy of the trailing part. The term "maximum-phase channel" implies that the energy of the leading part of the channel profile is less than the energy of the trailing part. More precisely, the position of the centroid of the energy, with respect to the mean arrival time, specifies (approximately) the type of channel response.

Figure 12:
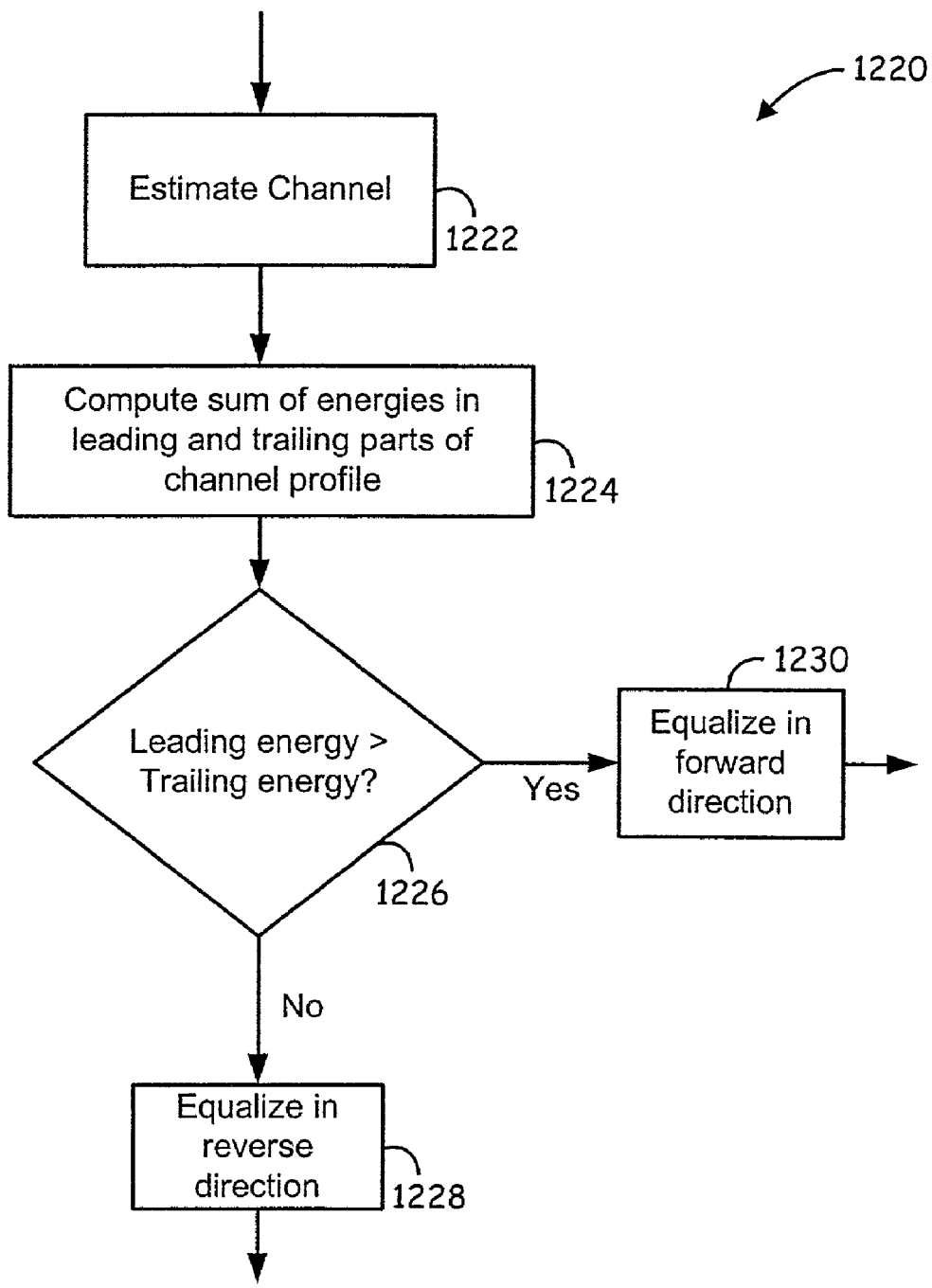
FIG. 12 is a flowchart of certain representative steps, according to one aspect of the present invention.

FIG. 12 shows a representative sequence of steps 1220 which might be used to implement the present invention. In step 1222, an estimate of the channel is performed. Referring again to FIG. 2, each section of received data symbols 212 and 214 is stored in the memory of the receiver (i.e., d0, d1, d2, etc., shown as 240) that can be retrieved and processed in any needed order. Step 1224 next shows the determination of the estimated channel response being minimum-phase or maximum-phase. For instance, the multipath energy given by the leading and trailing parts of the channel response is determined. Decision block 1226 next inquires whether the energy given by the leading part is greater than that given by the trailing part. If the energy given by the leading part is greater, then the channel is classified as having a minimum-phase response with a time-decaying shape (from left to right). If the energy from the trailing part is greater, then the channel is classified as having a maximum-phase response.

For a channel with maximum-phase response, the equalization is performed in a time-reversed manner, as shown in step 1228. For minimum-phase channels, the equalization is performed in a time-forward manner, as shown in step 1230. In FIG. 2, the comparable equalization steps are shown as 260 for reverse equalization of the received symbols 212, and 262 for forward equalization of the received symbols 214.

Figure 13:
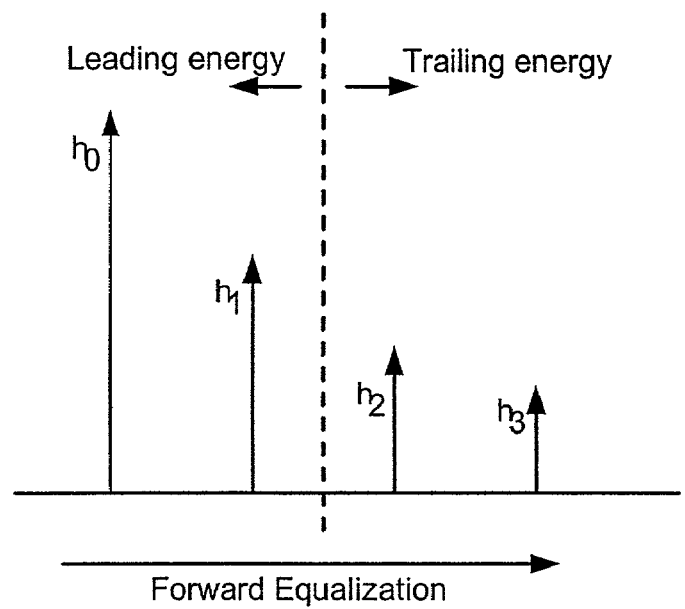
FIG. 13 is a plot of a representative channel response with the need for equalization in a time-forward manner.
Figure 14:
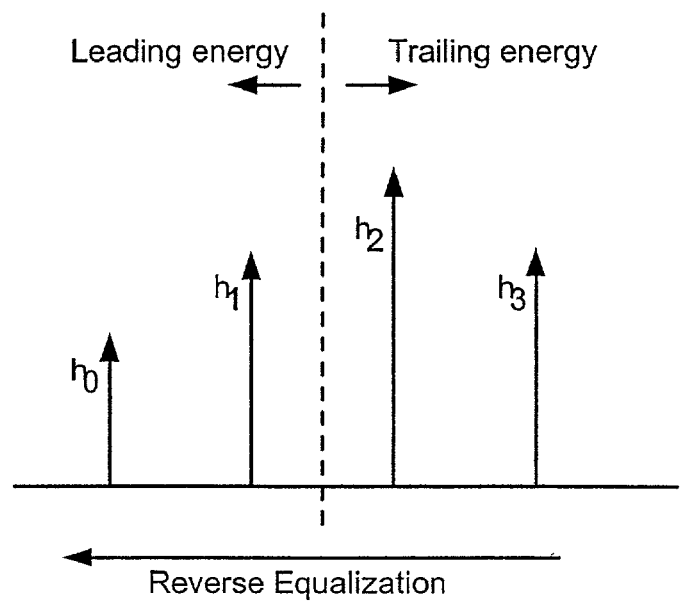
FIG. 14 is a plot of a representative channel response with the need for equalization in a time-reversed manner.

FIGS. 13 and 14 serve to further demonstrate the decision process used to determine whether forward or reverse equalization will be applied. FIG. 13 shows a representative channel with four complex components, $h_0$, $h_1$, $h_2$ and $h_3$. The following formula is used as the decision rule:

$$|h_0|^2+|h_1|^2>|h_2|^2+|h_3|^2. \quad (8)$$

In FIG. 13, according to the relative amplitudes shown, the energy from the leading part of the channel response will be greater than the trailing part, and the above formula will be "true." The channel will therefore have minimum-phase characteristics, and forward equalization will be performed. In FIG. 14, according to the relative amplitudes shown, the energy from the trailing part will be greater than the energy from the leading part, and the formula above will return "false." The channel will therefore have maximum-phase characteristics, and reverse equalization will be performed.

Accordingly, by using the described approach, the channel response can be classified on a burst/slot by burst/slot basis. For a burst where the channel response is classified as maximum-phase, the estimated channel response can be reversed in time, and the coefficients of the FFF and the FBF of the DFE can be computed based upon this time-reversed channel response. Furthermore, the FFF and FBF operations can be performed in a time-reversed order, i.e., the most recently received symbol can be fed into the filter first. As a result, the channel seen by the DFE is guaranteed to be minimum phase, since its time-reversed version has maximum phase. For a burst where the channel response is classified as minimum phase, the FFF and FBF operation can be performed in the normal order, i.e., the earliest-received symbol is processed first. Note that, while the concept of "leading" and "trailing" are used to refer to parts of the multipath channel profile, the present invention is not meant to be strictly limited to this physical description. The channel may be analyzed in a variety of ways to determine whether it is more appropriate to attempt equalization in a time-forward or in a time-reversed manner. The formula above, where the absolute values of the complex components are determined and squared, is intended to serve as a representative embodiment, with the present invention not intended to be limited to such computational methods.

Figure 15:
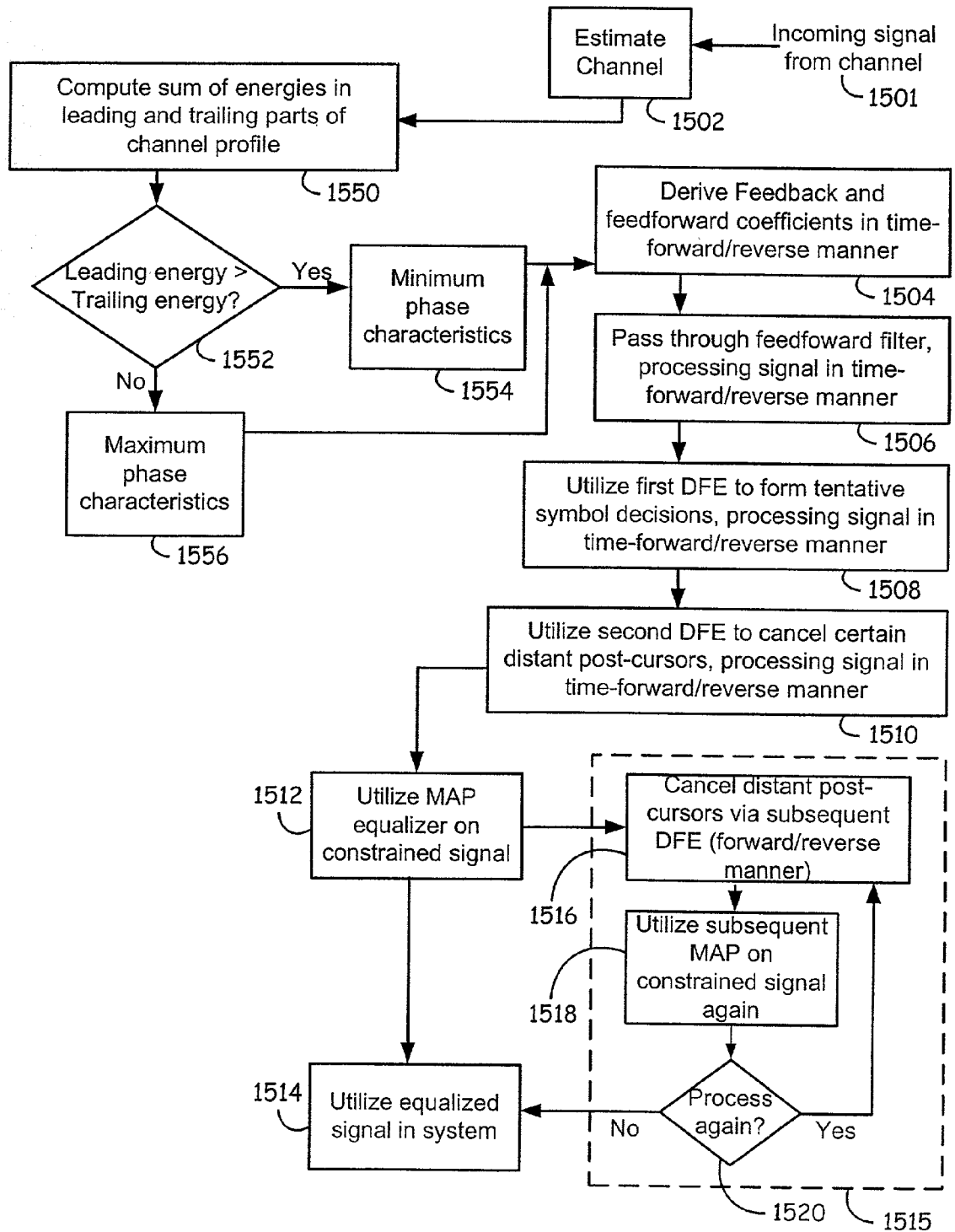
FIG. 15 is a flowchart, according to one aspect of the present invention, of certain representative steps that can be used to implement the present method of equalization, including (1) the combined DFE/MAP equalizer and (2) the enhanced ability to handle minimum and maximum phase channels.

FIG. 15 next shows a similar series of steps, which combine the general principles embodied in FIG. 12 with those of FIG. 11. In step 1502, an estimate is taken of the channel, which is shown receiving an incoming signal 1501, as per the general approaches described above. In step 1550, the channel estimates are used to compute the sum of the energies in the leading and trailing parts of the channel profile. Step 1552 inquires whether the energies in the leading portion of the signal are greater than the energies in the trailing portion of the signal. If yes, then the channel has minimum phase characteristics 1554. If no, then the channel has maximum phase characteristics 1556.

In step 1504, the feedback and feed-forward coefficients are derived for the associated filters of the DFEs, based upon the estimate of the channel response. The coefficients are computed from the channel response considered in a time-forward manner if the channel is minimum phase. The coefficients are computed from the channel response considered in a time-reverse manner if the channel is maximum phase. In step 1506, the signal next passes through a feed-forward filter whose coefficients have been determined in the manner above. The signal is processed in a time-forward manner if the channel is minimum phase, and processed in a time-reversed manner if the channel is maximum phase.

In step 1508, a first DFE (including at least a feedback filter and decision process) is utilized to form tentative symbol decisions. The signal is processed in a time-forward manner if the channel is minimum phase, and processed in a time-reversed manner if the channel is maximum phase. Step 1510 shows the second DFE being used to cancel (or subtract) certain distant post-cursors. Again, the signal is processed in a time-forward manner if the channel is minimum phase, and processed in a time-reversed manner if the channel is maximum phase. The number of post-cursors to be cancelled depends upon the memory of the channel response and the desired complexity of the MAP equalizer in the final implementation. The cancellation of such post-cursors serves to truncate the memory of the channel, whereby the overall complexity of the equalizer is reduced by reducing the complexity of the MAP equalizer. Step 1512 next runs a MAP equalizer on this truncated channel. Thereafter the resulting signal might be utilized (1514) as an equalized signal in any system that might require such an equalized signal.

Certain optional steps for implementation are shown in block 1515. Step 1516 is shown canceling certain distant post-cursors (again, like 1510, and also processing the signal data in a time-forward manner if the channel is minimum phase, and in a time-reversed manner if the channel is maximum phase.). This would be achieved by subsequent implementations of DFE components (i.e., feedback filters in association with feed-forward filters, and linear equalizers) as implied by arrows 1008 and 1010 in FIG. 10. Block

1518 next shows the step of utilizing a subsequent MAP equalizer on the constrained signal. Decision block 1520 inquires whether further processing is needed (or desired). If yes, then steps 1516 and 1518 can be repeated as many times as might be needed with subsequent equalizer implementations (again referring to elements 1008, 1010 in FIG. 10). Such implementations could also utilize the time-forward/reversed equalization described above in relation to channel characteristics. If no further processing is needed, then the flow proceeds to step 1514 where the resulting equalized signal is utilized.

Although the present invention has been particularly shown and described above with reference to specific embodiment(s), it is anticipated that alterations and modifications thereof will no doubt become apparent to those skilled in the art. It is therefore intended that the following claims be interpreted as covering all such alterations and modifications as fall within the true spirit and scope of the invention.

The invention claimed is:

1. A reduced-complexity equalizer apparatus for use with communication systems requiring equalization of a received signal subject to intersymbol interference (ISI), the apparatus comprising:
   a channel estimator for providing an estimated channel response of a channel from received signal data;
   a device for determining if the channel is minimum phase or maximum phase;
   a first decision feedback equalizer device which utilizes coefficients derived from the estimated channel response, based upon whether the channel is minimum phase or maximum phase and forms tentative symbol decisions, wherein the first decision feedback equalizer device includes a feed-forward filter and a feedback filter;
   at least a second decision feedback equalizer device which utilizes coefficients derived from the estimated channel response, based upon whether the channel is minimum phase or maximum phase, and the tentative symbol decisions from the first decision feedback equalizer, to truncate the channel response to a desired channel memory, wherein at least one second decision feedback equalizer device includes a feedback filter, wherein the coefficients of the feedback filter of the second decision feedback equalizer device is a subset of those of the feedback filter of the first-decision feedback equalizer device; and
   at least one non-linear equalizer device for providing equalization of the truncated channel response over the desired memory; and
   whereby the overall complexity of the equalizer apparatus is reduced by reducing the effective delay spread of the channel.

2. The reduced-complexity equalizer apparatus of claim 1, wherein post-cursor interference is subtracted from the output of the feed-forward filter in the first-decision feedback equalizer device and a hard symbol decision is made on this output.

3. The reduced-complexity equalizer apparatus of claim 1, wherein the second-decision feedback equalizer device constructs partial post-cursor interference using the decision from the output of the first decision feedback equalizer, and subtracts the partial post-cursor interference from the output of the feed-forward filter.

* * * * *